Patented May 13, 1952

2,596,165

UNITED STATES PATENT OFFICE 2,596,165

ARC STARTING METHOD AND COMPOSITION

Harold Spencer Payne, Cleveland, Ohio, assignor to The Lincoln Electric Company, Cleveland, Ohio, a corporation of Ohio No Drawing. Application May 6, 1949,
Serial No. 91,875

9 Claims. (Cl. 219—10)

The present improvements, relating as indicated to arc starting compositions, have more particular regard to the provision of a composition which will facilitate the striking of an arc in hand welding operation.

As recognized in the early text on "Fundamentals of Welding" by James W. Owens, the Penton Publishing Co., 1923, the greatest trouble experienced by a beginner, whether using bare or coated electrodes, is the tendency of the electrode to stick to the work, and the proper manipulation of the electrode end so as to make the necessary electrical contact between the electrode and the work and then separate them to establish the arc calls for considerable skill.

The foregoing difficulty thus early encountered has persisted to the present day, particularly in hand welding with an A. C. machine, i. e. using alternating current. Thus in the case of such A. C. machine it has been generally regarded as necessary to provide an initial surge current of greater intensity than is used during the welding operation proper. However, the provision of means to this end increases the complication and cost of the machine beyond what is feasible in the case of small shop or farm welding outfits.

I have now discovered that much, if not all, of the difficulty of thus striking the arc may be obviated by the application of a suitable chemical composition as hereinafter described to at least one of the surfaces wherefrom the arc is to be struck, this most conveniently being the welding end of the electrode.

To the accomplishment of the foregoing and related ends, said invention, then, consists of the means hereinafter fully described and particularly pointed out in the claims.

The following description sets forth in detail certain approved compositions of matter and methods of employing the same, such disclosed compositions and steps constituting, however, but one of various ways in which the principle of the invention may be used.

A composition which I have found highly suited to the purpose of striking an arc between electrode and work-piece consists of saltpeter (potassium nitrate) 1 part and mill scale 8 parts. Mill scale, as is well known, is a black scale of magnetic oxide of iron $Fe_3O_4$ such as is formed on iron and steel when heated for rolling, forging, and the like. It is also known chemically as ferroso-ferric oxide. While saltpeter is preferred as the other minor ingredient, other alkali metal nitrates, e. g. sodium nitrate and ammonium nitrate, may be substituted in whole or in part. It will also be understood that the ratio of the two ingredients may be varied from the one given above and still much increase the facility with which an arc may be struck.

For the purpose of use the ingredients in dry state will be thoroughly intermixed and ground to powdered form. A suitable quantity of the composition will then be placed in a container conveniently accessible to the welder so that he may insert or dip the end of the electrode which he happens to be using into the composition. Before thus inserting the electrode end it should be preliminarily heated to a point approaching redness. Where, as in the ordinary use of the electrode in hand welding, the operation will be interrupted a number of times in the course of using a single electrode, the end of the latter will thus be dipped in the present composition while such end is still hot from the welding operation just discontinued; otherwise it will be necessary initially to heat such end sufficiently by proceeding, as is the present practice in striking an arc, to draw or rub the end across the work-piece.

Obviously, while the composition is most conveniently used in the manner just set forth, it may be employed effectively by being applied to the portion of the work-piece surface wherefrom the arc is to be struck provided such surface has been brought to the required temperature beforehand.

Other modes of applying the principle of my invention may be employed instead of the one explained, change being made as regards the process herein disclosed or the materials employed in carrying out the process, provided the steps or ingredients stated by any of the following claims or the equivalent of such stated steps or ingredients be employed.

I therefore particularly point out and distinctly claim as my invention:

1. A composition for facilitating the striking of an arc between a metal welding electrode and work-piece, said composition consisting of mobile granule-containing material comprising a major proportion of ferroso-ferric oxide and a minor proportion of an alkali metal nitrate intermixed therewith.

2. A composition for facilitating the striking of an arc between a metal welding electrode and work-piece, said composition consisting of mobile granule-containing material comprising a major proportion of mill scale and a minor proportion of saltpeter intermixed therewith.

3. A composition for facilitating the striking of an arc between a metal welding electrode and work-piece, said composition consisting of mobile granule-containing material comprising approximately eight parts by weight of mill scale and one part of saltpeter intermixed therewith.

4. A composition for facilitating the striking of an arc between a metal welding electrode and work-piece, said composition being fugitive in starting the arc and consisting of mobile granule-containing material comprising a major proportion of a resistance-providing iron oxide interposing resistance occasioning heat and flash-over arcing, and a minor proportion of an arc-sustaining salt.

5. In a welding process wherein an arc between a metal electrode and the work-piece is the welding instrumentality, the method of obviating sticking in starting such arc which includes preliminarily applying to a surface wherefrom the arc is to be struck a composition consisting of mobile granule-containing material comprising a major part of ferroso-ferric oxide and a minor part of an alkali metal nitrate intermixed therewith, and further obviating sticking each time the electrode is removed and re-contacted with the work-piece by first each time freshly applying such granule-containing composition.

6. In a welding process wherein an arc between a metal electrode and the work-piece is the welding instrumentality, the method of obviating sticking in starting such arc which includes preliminarily applying to the end of the electrode wherefrom the arc is to be struck a composition consisting of mobile granule-containing material comprising a major part of ferroso-ferric oxide and a minor part of an alkali metal nitrate intermixed therewith, and further obviating sticking each time the electrode is removed and re-contacted with the work-piece by first each time freshly applying such granule-containing composition.

7. In a welding process wherein an arc between a metal electrode and the work-piece is the welding instrumentality, the method of obviating sticking in starting such arc which includes preliminarily heating the end of the electrode from which the arc is to be struck and then dipping such end into a mixture consisting of mobile granule-containing material comprising a major part of ferroso-ferric oxide and a minor proportion of an alkali metal nitrate.

8. In a welding process wherein an arc between a metal electrode and the work-piece is the welding instrumentality, the method of obviating sticking in starting such arc which includes preliminarily heating the end of the electrode from which the arc is to be struck and then dipping such end into a mixture consisting of mobile granule-containing material comprising approximately eight parts by weight of mill scale and one part of saltpeter.

9. In a welding process wherein an arc between a metal electrode and the work-piece is the welding instrumentality, obviating sticking in starting such arc by first applying between the electrode and work where the arc is to be struck a composition consisting of a mobile granule-containing material comprising a major proportion of a component providing resistance greater than the metal electrode, and another component which is an arc-sustaining salt, then contacting the electrode to the metal to be welded, thereby supplying partial resistance to produce heat and flash-over arcing and then sustaining the arc by the vapor products of the metal salt until the working-arc takes over, and each time the electrode is removed and re-contacted with the metal to be welded obviating sticking by similarly interposing such granule-containing composition.

HAROLD SPENCER PAYNE.

REFERENCES CITED

The following references are of record in the file of this patent:

UNITED STATES PATENTS

| Number | Name | Date |
| --- | --- | --- |
| 1,754,116 | Meunier | Apr. 8, 1930 |
| 2,021,628 | Larson | Nov. 19, 1935 |
| 2,370,100 | White | Feb. 20, 1945 |
| 2,472,923 | Schmerber | June 14, 1949 |